INVENTOR.
GORDON T. ROSENLND
BY
William F. Woods
ATTORNEY

May 29, 1962  G. T. ROSENLUND  3,037,104
CONTROL FOR ELECTRICAL CIRCUIT BREAKERS
Filed Jan. 13, 1960  2 Sheets-Sheet 2

INVENTOR.
GORDON T. ROSENLUND
BY William F. Woods
ATTORNEY

United States Patent Office 3,037,104
Patented May 29, 1962

3,037,104
CONTROL FOR ELECTRICAL CIRCUIT BREAKERS
Gordon T. Rosenlund, Minneapolis, Minn., assignor to Hi-Products, Inc., a corporation of Minnesota
Filed Jan. 13, 1960, Ser. No. 2,215
8 Claims. (Cl. 200—172)

This invention concerns a new and improved means for controlling electrical circuit breakers; in particular, the invention contemplates novel means for engaging or disengaging selected circuit break switch handles in a circuit breaker system.

The purpose of overcurrent protection is to prevent the attainment of excessive or dangerous temperatures in electrical conductors; to preserve continuity of service on all circuits that have been operating normally; and to limit the amount of energy liberated in the event of an electrical failure. Protection is achieved by automatically interrupting the source of current supply to the particular circuit in distress. In many cases this is done by means of a recloseable power switching mechanism (commonly known as a circuit breaker) that can be tripped open by direct-acting trip coils or tripping relays. Such a device may be called upon to interrupt any value of current up to the maximum associated with the available short-circuit capacity at its source terminals.

Recent trends in the power distribution field (particularly in rural applications) have emphasized the advantages and desirability of remote pole-top mounting for metering and circuit breaker cabinets. Among other things, pole-top installation of circuit breaker cabinets and related equipment eliminates the cost of running heavy service wires from the top of the pole down to waist level, obviates the necessity for a conventional meter service loop and avoids the attendant voltage drop due to the extra wire. Safety is also increased by having the electrical apparatus elevated out of the way. With the advent of the pole-top circuit breaker, it has become necessary to provide remote control for operating the switches in the circuit breakers.

Moreover, the control means for pole-top circuit breakers should be designed so as to provide means for selectively engaging one or both of the switches in the cabinet, either independently or simultaneously. A further desideratum in a pole-top mounted circuit breaker system is a mechanically actuated interlock for the control means adapted to provide maximum safety and ease of operation.

Accordingly it is a primary object of this invention to provide an improved pole-top circuit breaker system.

A further important object of this invention is to provide improved means for controlling pole-top circuit breakers.

Another object of this invention is to provide an improved means for controlling circuit breaker switches that are positioned adjacent each other in a cabinet located out of normal reach from the ground.

Still another object of this invention is to provide in a pole-top circuit breaker novel means for selectively engaging desired switches for operation from the ground level.

Yet another object of this invention is to provide a new and improved means cooperable with the switch actuation means of a pole top circuit breaker for effectuating the operation of a selected switch or switches without disturbing the other switch or switches.

Another object of this invention is to provide in a pole top circuit breaker having an elongated control rod extending to waist level novel means cooperable with the control rod for engaging or disengaging a selected switch in the circuit breaker.

A further object of this invention is to provide in a pole top circuit breaker having means for selectively engaging a desired circuit breaker handle novel means for locking the handle engaging in a desired position.

Yet another object of this invention is to provide a circuit breaker adapted for mounting on the top of a pole and controlled from the ground.

A further object of this invention is to provide in a remotely controlled circuit breaker means for selectively actuating individual switches therein.

Another object of this invention is to provide in a remote control device for operating pole top circuit breakers means for providing both independent and simultaneous operation of a plurality of circuit breakers with a single control handle at the base of the pole.

Another object of this invention is to provide in a remotely actuated pole top circuit breaker apparatus novel means for selecting individual breakers therein characterized by safety in operation and positive action.

Still another object of this invention is to provide a new and improved control mechanism for pole top circuit breakers of simple design and easy to manufacture.

Another object of this invention is to provide novel apparatus for actuating a pole top circuit breaker from ground level without sacrificing the control flexibility inherent in an installation at or near ground level.

Another object of this invention is to provide in a remote control device for operating pole top circuit breaker switches from ground level novel means for preventing breakage of the switches during operation of the device.

These and other objects and advantages of the invention will become more fully apparent from a consideration of the following detailed specification and accompanying drawings wherein a preferred embodiment of the invention is shown by way of illustration only.

Figures 1, 2:
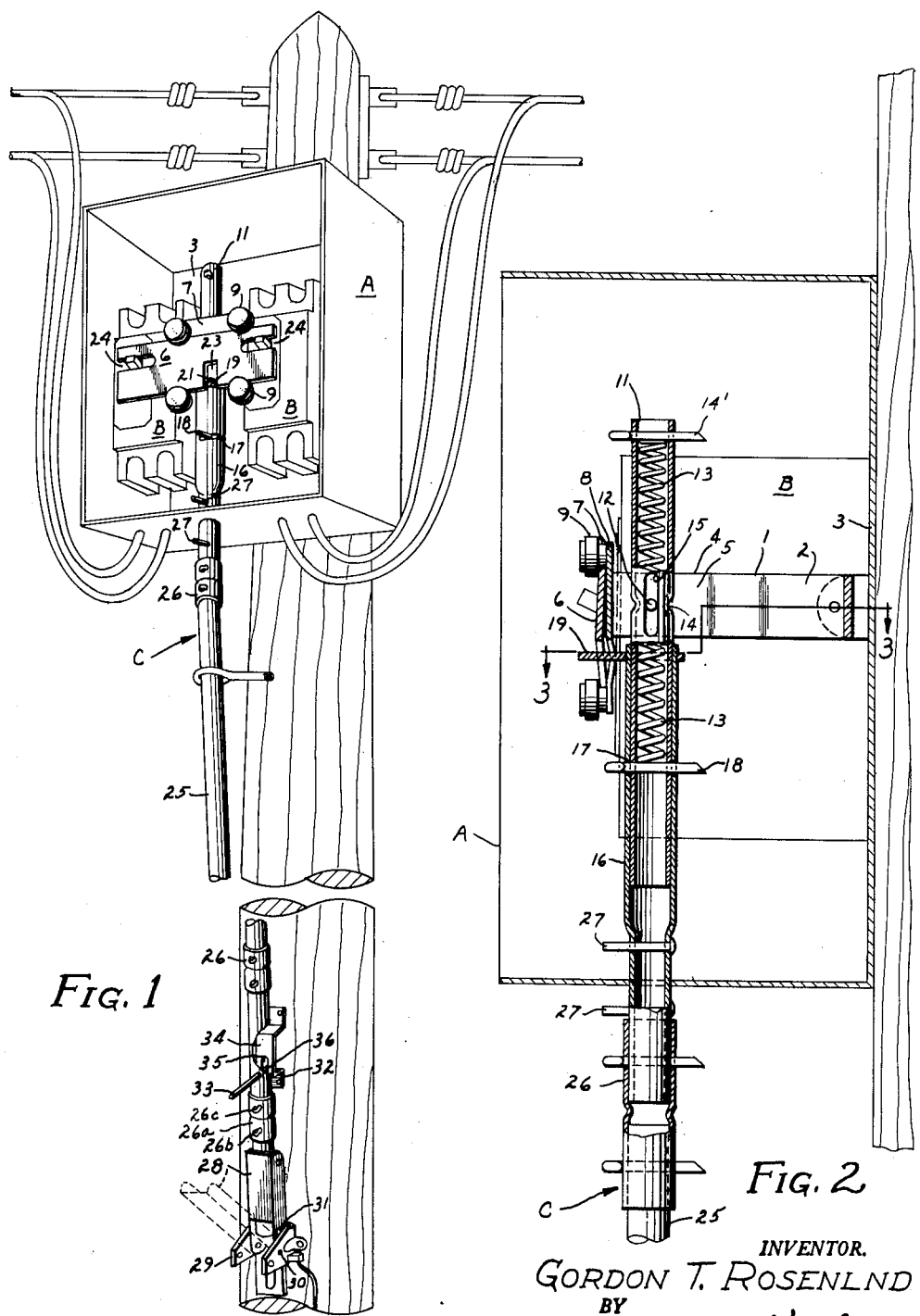
FIGURE 1 is a perspective view, partially broken away, illustrating the invention in its entirety in position on a utility pole.
FIGURE 2 is an enlarged fragmentary view, partially in section, along the longitudinal centerline of the circuit breaker cabinet of FIGURE 1.

Referring now to FIGURE 1 of the drawings, the letter A designates a pole top circuit breaker cabinet mounted near the top of a utility pole. In a typical installation two circuit breakers B are mounted in the cabinet in a side by side relationship and are connected by suitable means between the power lines and the load distribution lines. The invention, designated in its entirety by the reference character C, is pivotally mounted at its upper end between circuit breakers B with a part thereof extending through the cabinet A to a convenient operating position above the ground, as will be explained.

Figure 3:
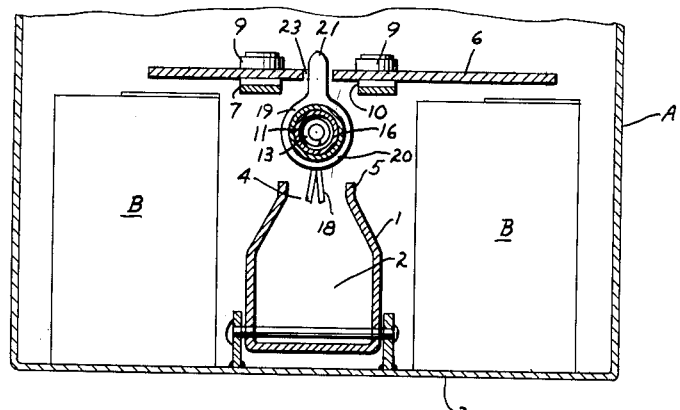
FIGURE 3 is a view, partially broken away and partially in section, taken along the line 3—3 of FIGURE 2.

As more clearly illustrated in FIGURES 2 and 3, the upper circuit breaker engaging control of the invention C is positioned in cabinet A. Pivoted yoke member 1, which is preferably formed from a single blank of relatively thin steel plate, constitutes the supporting element of the upper structure. Yoke 1 is characterized by a relatively wide lower section 2 pivotally secured, so as to rotate about a horizontal axis, to the rear inner wall 3 of cabinet A. Lower section 2 tapers into a narrow upper throat section 4 having supporting legs 5 which are generally disposed in a plane perpendicular to the axis of rotation of yoke 1.

Figure 4:
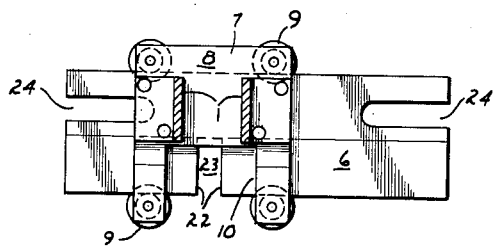
FIGURE 4 is a rear sectional view, on an enlarged scale, of the circuit breaker handle actuator assembly employed in the invention.

A circuit breaker handle engaging slide bar 6 is slideably mounted on yoke 1 by means of slide holder 7 which is securely attached, as by riveting, to legs 5. Slide holder 7 has a flat plate like supporting body 8 substantially square in shape and carrying at each corner thereof rollers 9 which rotate about spaced vertical axes and slideably containing therebetween slide bar 6, as shown in FIGURE 4. The rollers 9 may be fabricated of a material such as nylon and the like to reduce wear and friction. Slide holder 7 is further characterized by a rectangular opening 10 extending inwardly from its lower edge for purposes which will become apparent.

A cylindrical spring tube 11 is slidably mounted, by means of bearing pin 12, in throat section 4 of yoke 1. Positioned within spring tube 11 on each side of bearing pin 12 are compression springs 13. Springs 13 are preloaded during their insertion into tube 11 and are held apart at their inner ends by crimps 14 formed on each side of tube 11 which are in register with bearing pin 12. The outer ends of springs 13 are restrained from axial movement by virtue of cotter pins 14' and 18 which extend radially through tube 11. The positioning of springs 13 in tube 11 on each side of bearing pin 12 permits the axial displacement of tube 11 on each side of pin 12 by virtue of longitudinal slots 15 which are arranged on opposite sides of tube 13 thereby providing a cushioning effect upon yoke 1 as it moves about its axis.

Rotatably secured to, coaxial with and surrounding the lower end of spring tube 11 is shift tube 16. Shift tube 16 is adapted to rotate in a restricted arc about its longitudinal axis, its rotation being limited by a pair of matching opposed slots 17 cut therein into which cotter pin 18 is placed. The upper end of shift tube 16 is positioned rather close to yoke 1 and the lower end of longitudinal slots 15 in tube 11. A toothed shift gear 19 is staked integral with the upper end of shift tube 16 and positioned so as to be in register with opening 10 in slide holder 7. Shift gear 19 has a lower ring like body 20 terminating in a radially upward extending pointed tooth 21 adapted to project through opening 10 in slide holder 7. From the foregoing description it is apparent that the rotation of shift tube 16 about its longitudinal axis causes tooth 21 to describe an arc within opening 10 limited in its angular displacement by the arc defined by the slots 17 in tube 16. The length of opening 10 in slide holder 7 also coincides with the travel allowed tooth 21 by slots 17.

Slide bar 6, shown in FIGURE 4 of the drawings, which completes the assembly of the upper control structure of the invention, is constructed preferably of thin cold rolled steel and bent slightly in its transverse cross section to fit snugly yet slidably within the inner opposed edges of spaced roller guides 9 positioned on slidebar holder 7. When slide bar 6 is mounted between roller guides 9 of holder 7, tooth 21 of shift gear 19 engages the side walls 22 of recess 23 which extends perpendicularly inward from the lower edge of slide bar 6. A pair of circuit breaker handle engaging slots 24 extending inwardly from and perpendicular to each end of slide bar 6 provide means for actuating a desired circuit breaker handle or handles, as will be explained.

Attached to and coaxial with the lower end of shift tube 16 is an elongated control rod 25, suitably coupled, as at 26, to allow ease of installation which extends through the bottom of cabinet A and runs down the utility pole, as illustrated in FIGURE 1. Axial movement of rod 25 may be limited by suitable collars or pins 27 positioned on each side of the bottom of cabinet A to further reduce the chances of damaging the internal components in cabinet A. The lower end of control rod 25, which may be fabricated of ordinary electrical conduit, terminates ultimately in control handle 28, which is mounted in a convenient position on the pole. Control handle 28 is preferably toggle mounted about waist high in a rigid U-shaped support 29. Support 29 includes a bearing pin 30 which rotatably carries the lower end of control handle 28. Bearing pin 31 in control handle 28 is adapted to pivotally carry the terminal end of rod 25 and to impart longitudinal movements thereto.

Figure 5:
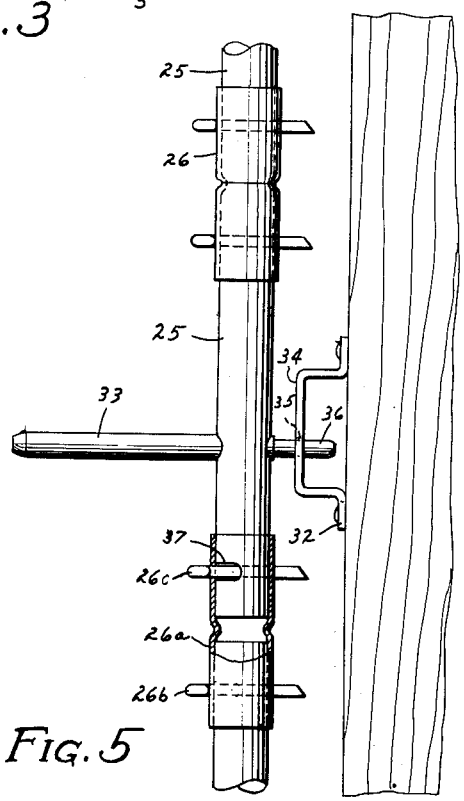
FIGURE 5 is a fragmentary view, partially in section, of the shift means employed in the invention.

Positioned a short distance above handle 28 and directly beneath rod 25 on the pole is shift lock 32 adapted to provide in cooperation with shift handle 33 facile means for locking rod 25 in a selected angular position. Shift lock 32, bolted to the pole, is characterized by a raised center section 34 having an open elongated slot 35 in the lower end thereof for receiving the contact end 36 of shift handle 33 which extends radially through and is carried by rod 25 in the manner shown in FIGURE 1. As illustrated in FIGURES 1 and 5, coupling 26a is rigidly secured at its lower end to the terminal portion of rod 25 by means of cotter pin 26b. At the upper end of coupling 26a another cotter pin 26c rotatably fastens the upper portion of rod 25 thereto. An arcuate slot 37 in the section of rod 25 immediately above coupling 26a permits the entire upper section of rod 25 and shift tube 16 to rotate about their common longitudinal axis when shift handle 33 is rotated.

Shift lock 32 is so positioned that when contact end 36 of handle 33 is lodged within slot 35 thereof both breakers are engaged by slide bar 6. To disengage the breakers control handle 28 must be pulled outwardly from the pole thereby moving contact end 36 out of engagement slot 35 in shift lock 32. This action disengages the circuit breakers and permits the axial rotation of rod 25 by means of shift handle 33 either in a clockwise or counterclockwise direction. Movement of control handle 28 in an upward or closed direction will then energize the selected circuit breaker according to whatever circuit breaker handle is engaged by slide bar 6 in its new position which is determined by the rotational direction imparted to shift handle 33. When control rod 25 is raised to its upper or closed position contact end 36 of handle 33 slidably engages the outer longitudinal edge of shift lock 32 thereby locking it from further rotation.

It should be understood that slide bar 6 may have circuit breaker engaging slots of different shapes from those shown and described to provide still more variation in the control of the circuit breakers. For example, slots 24 may extend in slide bar 6 in two directions or they may describe a cam surface for different switching purposes from those discussed.

It is also apparent that the construction of slide holder 7 may vary from the embodiment shown in the drawings. For example, slide holder 7 may be characterized by opposed longitudinal edges which are turned in to form parallel ways adapted to slidably receive slide bar 6 therebetween. A slight longitudinal deformation may be formed in slide bar 6 to provide a frictionally restrained sliding surface along each longitudinal edge thereof. Furthermore, recess 10 in slide holder 7 may be in the form of an enclosed aperture. And, for purposes of clarity and convenience, the hinged rain tight cover attached to cabinet A is omitted in the drawings.

Thus there has been described a new and improved pole top circuit breaker and control therefor; apparatus that is characterized by simplicity in design and ease of operation, yet able to perform those functions attributed to it. While the invention has been shown in a preferred form it is to be understood that the invention may be practiced by other means than those shown and is to be limited in scope only by the appended claims.

I claim:

1. An overload current interrupter device adapted for positioning near the power lines on a utility pole including a waterproof boxlike cabinet, a pair of circuit breakers mounted on the rear wall of said cabinet, each of said circuit breakers having a switch handle disposed in a common plane with respect to each other, a yoke member pivotally mounted on the rear wall of said cabinet intermediate said circuit breakers, an apertured support carried by the free end of said yoke member, an apertured switch handle engaging guide slidably mounted in said support adapted to engage and control a switch handle at each end thereof, an actuator rod pivotally connected to said yoke member intermediate the pivotal mounting means of said yoke member and said apertured support, said actuator rod being adapted for longitudinal axial movement, a cylindrical shift tube coaxial with and surrounding the lower end of said actuator rod adapted to rotate in a restricted arc about the longitudinal axis thereof, a shift gear mounted on said shift tube adapted to extend through the apertures in said apertured support and said apertured switch handle engaging guide and translate the rotational movement thereof to a transverse sliding movement of said switch handle engaging guide whereby to effectuate the selection of one or both of said switch handles, an elongated control rod fastened to the end of said shift tube remote from said shift gear and extending through said cabinet to a convenient height on the utility pole, a shift lock on the pole, a slender elongated radially mounted shift control member attached to said control rod for imparting rotational movements thereto and being cooperable with said shift lock to prevent rotation of said shift gear when said switch handles are in an energized position, and hand engageable means at the lower terminus of said control rod to impart longitudinal axial movements thereto.

2. The device of claim 1 wherein said actuator rod is spring biased on each side of said pivotal connection in said yoke member to reduce the chance of injury to said device during the operation thereof.

3. In a recloseable power switching mechanism having a cabinet with at least two circuit breakers therein mounted near the top of a utility pole and adapted to provide overcurrent protection between incoming power lines and outgoing load distribution lines, the improvement for selectively engaging and operating either simultaneously or independently the circuit breakers in said mechanism, said improvement comprising a pivotal yoke mounted in said cabinet, means associated with said yoke for selectively engaging either simultaneously or independently said circuit breakers, axially and radially movable control rod means extending from said cabinet cooperable with said yoke and said circuit breaker engaging means adapted to selectively actuate either simultaneously or independently said circuit breakers, and means including hand engageable means for imparting axial and rotary movements to said control rod means whereby to selectively engage either simultaneously or independently said circuit breakers.

4. The device of claim 3 wherein means cooperable with said control rod means are provided to prevent the selection of a circuit breaker while any of said circuit breakers are in an energized position.

5. A control for selectively emergizing a plurality of electrical circuit breaker switches in a circuit breaker cabinet comprising a yoke rotatably mounted in the cabinet between the circuit breakers, an arm pivotally carried adjacent the free end of said yoke, a slide bar slidably positioned on the free end of said yoke transverse to said arm having slots therein adapted to receive the handles of the circuit breakers and having an actuating recess therein, an actuating member rotatably surrounding and coaxial with said arm, a shift gear on said actuating member adapted to engage the actuating recess in said slide bar whereby to move said slide bar into or out of engagement with the circuit breaker handles, means for restricting the angular movement of said shift gear, and means for locking said shift gear in a selected position.

6. Apparatus for controlling the switches in an electrical pole top overload device of the type having a pair of circuit breakers mounted in a cabinet including a U-shaped support pivotally mounted between the circuit breakers so as to rotate about a horizontal axis, a pin in said support intermediate the rotatable axis and the free end thereof, a recessed slide holder carried by the free end of said support, an elongated hollow member having opposed longitudinal slots slidably receiving said pin, means on each side of said pin for normally biasing said hollow member into engagement with said pin at substantially the median portion of the slots therein, a rectangular slide bar slidably mounted in said slide holder with the longitudinal axis thereof normal to the axis of said hollow member, said slide bar having circuit breaker switch handle engaging recesses in each end thereof and an actuator engaging recess intermediate the ends thereof, an elongated cylindrical shift tube coaxial with and surrounding said hollow member, a toothed actuator attached to the upper end of said shift tube adapted to extend through the recess in said slide holder and contact the actuator engaging recess of said slide bar, means for limiting the angular displacement of said actuator in accordance with the spacing between the circuit breaker handles, an elongated control rod attached to said shift tube extending therefrom through the bottom of the cabinet down the pole, an arm receiving shift lock secured to the pole within reach of the ground, a radially mounted shift handle having a slender rigid end extending integral therewith through said control rod so as to engage said shift lock, said shift handle being adapted to impart rotary motion to said control rod whereby to select a desired circuit and adapted in connection with said shift lock to rotate only when the circuit breakers are disengaged, and a control handle secured to said control rod adapted to actuate the breakers in the cabinet by imparting longitudinal movements to said control rod.

7. The device of claim 6 wherein said slide holder includes spaced anti-friction means for slidably containing said slide bar.

8. The device of claim 6 wherein said shift lock is characterized by an elongated body of relatively thin cross section and a width substantially equal to the diameter of said control rod, said body having a central raised section thereof spaced substantially parallel to and intermediate said control rod and the pole, the raised section of said body further having a longitudinal downwardly open recess therein whereby to receive the inner end of said control handle and adapted to slidably engage along each outer longitudinal edge thereof the inner end of said shift handle and prevent the same from rotary motion when said control handle is in an engaged position.

References Cited in the file of this patent

UNITED STATES PATENTS

| | | |
|---|---|---|
| 2,660,944 | French | Dec. 1, 1953 |
| 2,917,445 | Oakes et al. | Dec. 15, 1959 |
| 2,944,132 | Franke | July 5, 1960 |